United States Patent
Wu et al.

(10) Patent No.: US 7,168,071 B2
(45) Date of Patent: Jan. 23, 2007

(54) METHOD AND SYSTEM OF PERMITTING STACK ALLOCATION TO PROGRAMS HAVING OPEN-WORLD FEATURES

(75) Inventors: Gansha Wu, Beijing (CN); Guei-Yuan Lueh, San Jose, CA (US); Xiaohua Shi, Beijing (CN); Jinzhan Peng, Beijing (CN)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 10/675,008

(22) Filed: Sep. 30, 2003

(65) Prior Publication Data

US 2005/0080980 A1     Apr. 14, 2005

(51) Int. Cl.
*G06F 9/45*     (2006.01)
(52) U.S. Cl. ........................... 717/153; 717/141
(58) Field of Classification Search ............. 717/127, 717/141, 148, 153; 711/165, 170–173; 707/205–206; 714/5, 8, 42, 53–54
See application file for complete search history.

(56) References Cited

U.S. PATENT DOCUMENTS

| | | | | |
|---|---|---|---|---|
| 5,632,034 A * | 5/1997 | O'Farrell | ............... | 717/140 |
| 6,308,319 B1 * | 10/2001 | Bush et al. | ............... | 717/141 |
| 6,381,738 B1 * | 4/2002 | Choi et al. | ............... | 717/140 |
| 6,505,344 B1 * | 1/2003 | Blais et al. | ............... | 717/151 |
| 6,643,753 B1 * | 11/2003 | Avner et al. | ............... | 711/170 |
| 6,675,378 B1 * | 1/2004 | Schmidt | ............... | 717/154 |
| 7,058,943 B1 * | 6/2006 | Blais et al. | ............... | 718/1 |
| 2004/0015920 A1 * | 1/2004 | Schmidt | ............... | 717/153 |

OTHER PUBLICATIONS

Choi et al. "Stack Allocation and Synchronization Optimiztions for Java Using Escape Analysis" ACM Transactions on Programming Languages and Systmes, vol. 25,No. 6, Nov. 2003, pp. 876-910.*
Choi et al. "Escape Analysis for Java" ACM SIGPLAN Conference on Object Oriented Programming Systems, Languages, and Applications (OOPSLA99) Nov. 1, 1999, pp. 1-19.*

* cited by examiner

*Primary Examiner*—Meng-Al T. An
*Assistant Examiner*—William H. Wood
(74) *Attorney, Agent, or Firm*—L. Cho

(57) ABSTRACT

A system of permitting stack allocation in a program with open-world features is described. The system includes an escape analysis module to (1) determine which objects of the program can be stack-allocated under a closed-world assumption and (2) analyze, after stack allocation, which stack allocation is invalidated due to the occurrence of an open-world feature. A stack allocation module is provided to stack-allocate these objects based on the determination of the escape analysis module. A stack allocation recovery module is provided to recover those invalidated stack allocations back to their original allocation in heap based on the analysis of the escape analysis module. A method of permitting stack allocation in a program with open-world features is also described.

16 Claims, 8 Drawing Sheets

METHOD AND SYSTEM OF PERMITTING STACK ALLOCATION TO PROGRAMS HAVING OPEN-WORLD FEATURES

FIELD

An embodiment of the present invention pertains to execution of software programs. More specifically, an embodiment of the present invention relates to a method and system of permitting stack allocation to software programs written in languages with open world features.

BACKGROUND

The need for increased portability of software programs has resulted in increased development and usage of runtime environments. The term portability refers to the ability to execute a given software program on a variety of computer platforms having different hardware, operating systems, etc. The term "runtime environment" may also be referred to as runtime system or virtual machine. The runtime environment allows software programs in source code format to be executed by a target execution platform (i.e., the hardware and operating system of a computer system) in a platform-independent manner. This means that source code instructions are not statically compiled and linked directly into native or machine code for execution by the target execution platform. Instead, the instructions are statically compiled into an intermediate language (e.g., byte-code) and the intermediate language may then be interpreted or subsequently compiled by a just-in-time (JIT) compiler within the runtime environment into native or machine code that can be executed by the target execution platform.

Object-Oriented Programming Languages (OOPLs) have been developed to improve the productivity of developing software programs. The OOPLs typically include Java (developed by Sun Microsystems, Inc.) and other programming languages conforming to CLI (Common Language Infrastructure)(developed by Microsoft Corporation). Employing OOPLs, program developers can create small, reusable sections of program code known as "objects". The objects, once created, can be quickly and easily combined and re-used to create new programs. Some OOPLs provide open-world features (e.g., dynamic class loading, native methods, and reflection) that can dynamically link in the methods that are about to be called.

In programs written in an OOPL (e.g., Java), memory allocation and reclamation during compilation are handled entirely by the runtime environment, which relieves the programmer's burden of determining how and when to destroy unneeded objects. In this case, all objects are typically allocated to and from a common "heap" section of memory (i.e., heap allocation). The garbage collection mechanism then monitors the objects in the heap, and periodically deletes unneeded objects, thus reclaiming portions of the heap that are occupied by objects that can no longer be accessed from the user's program.

However, one problem with the heap allocation is that the users have less control over the program's performance. Each time an object is heap-allocated, a certain cost is incurred as the memory manager updates its data structures. Furthermore, an additional cost must be paid to reclaim the object during garbage collection. Although these costs are small when considered individually, the sheer frequency of object allocation and reclamation result in a significant portion of program execution time being spent in the memory manager, allocating and reclaiming memory for objects.

A prior technique has been proposed to allocate some objects on a method's stack frame (i.e., stack allocation), rather than going to the heap for each object. According to this approach, if the runtime environment can automatically detect objects whose "lifetime" does not extend beyond the method in which they are created, these objects can be automatically allocated on the stack by the JIT compiler rather than from the garbage-collected heap, resulting in improved performance. The technique used to determine which objects may be stack-allocated is called "escape analysis". The idea of escape analysis is to determine which objects have lifetime that does not "escape" from the methods that create them. Escape analysis is a static analysis. Escape analysis makes the following analysis: an object o that does not escape from method m (i.e., whose lifetime is included in m runtime) can be stack-allocated in m.

However, problems arise when applying stack allocation for programs written in OOPLs that contain open-world features. This is due to the fact that prior escape analysis techniques rely on an inter-procedural analysis that analyzes all methods that could possibly be executed during program execution. This means that the prior escape analysis techniques are based on a statically linked code model that assumes that no new classes of objects will be loaded during runtime. In other words, the prior escape analysis techniques are based on a closed-world assumption (i.e., the program can be statically linked before execution). However and as described above, some OOPLs provide open-world features (e.g., dynamic class loading, native methods, and reflection). These open-world features will render the closed-world assumption unrealistic, which will be explained below.

For example, dynamic class loading allows dynamic linking of methods or functions that are about to be called within a runtime context. However, loading a class dynamically into a runtime environment that is executing a previously optimized program (e.g., a program from which synchronization has been removed in whole or in part) may cause the program to behave in an unsafe manner (e.g., data contention) or fail. While the prior escape analysis techniques based on a statically linked code model can be used to remove synchronization from statically linked code, these techniques do not support the restoration of synchronization to previously desynchronized (i.e., optimized) code that subsequently requires synchronization due to the effects of a dynamically loaded class. Additionally, other open-world features such as reflection and native methods can invalidate an escape analysis, thereby leading to unsafe execution conditions.

Thus, there exists a need for providing stack allocation to programs that have open world features.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

Figure 1:
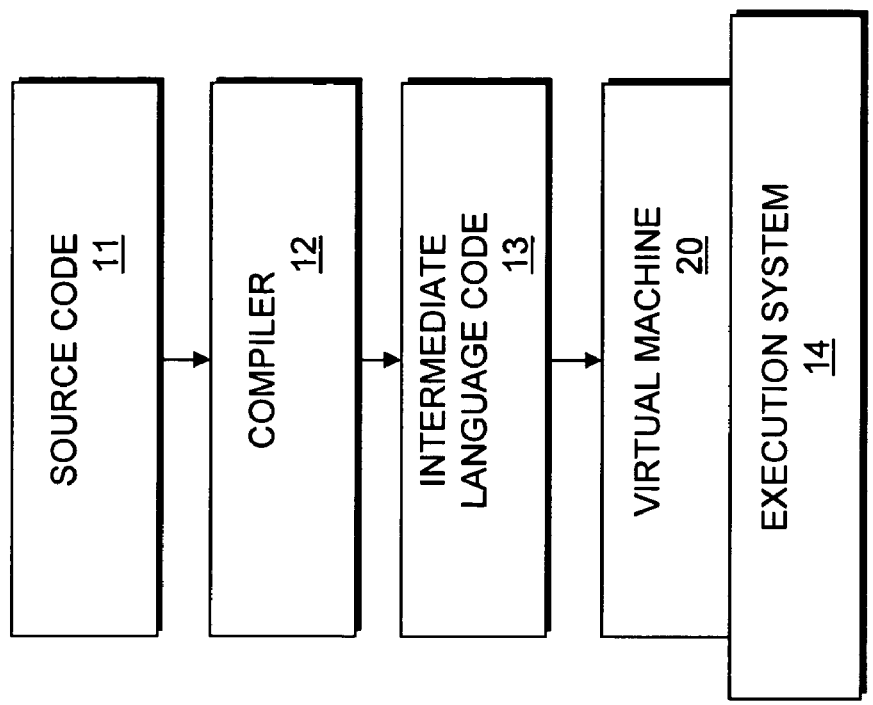
FIG. 1 is a block diagram showing an exemplary architecture that compiles and execute a software program in source code format, wherein the architecture includes a virtual machine (or runtime environment) within which one embodiment of the present invention is implemented.
Figure 2:
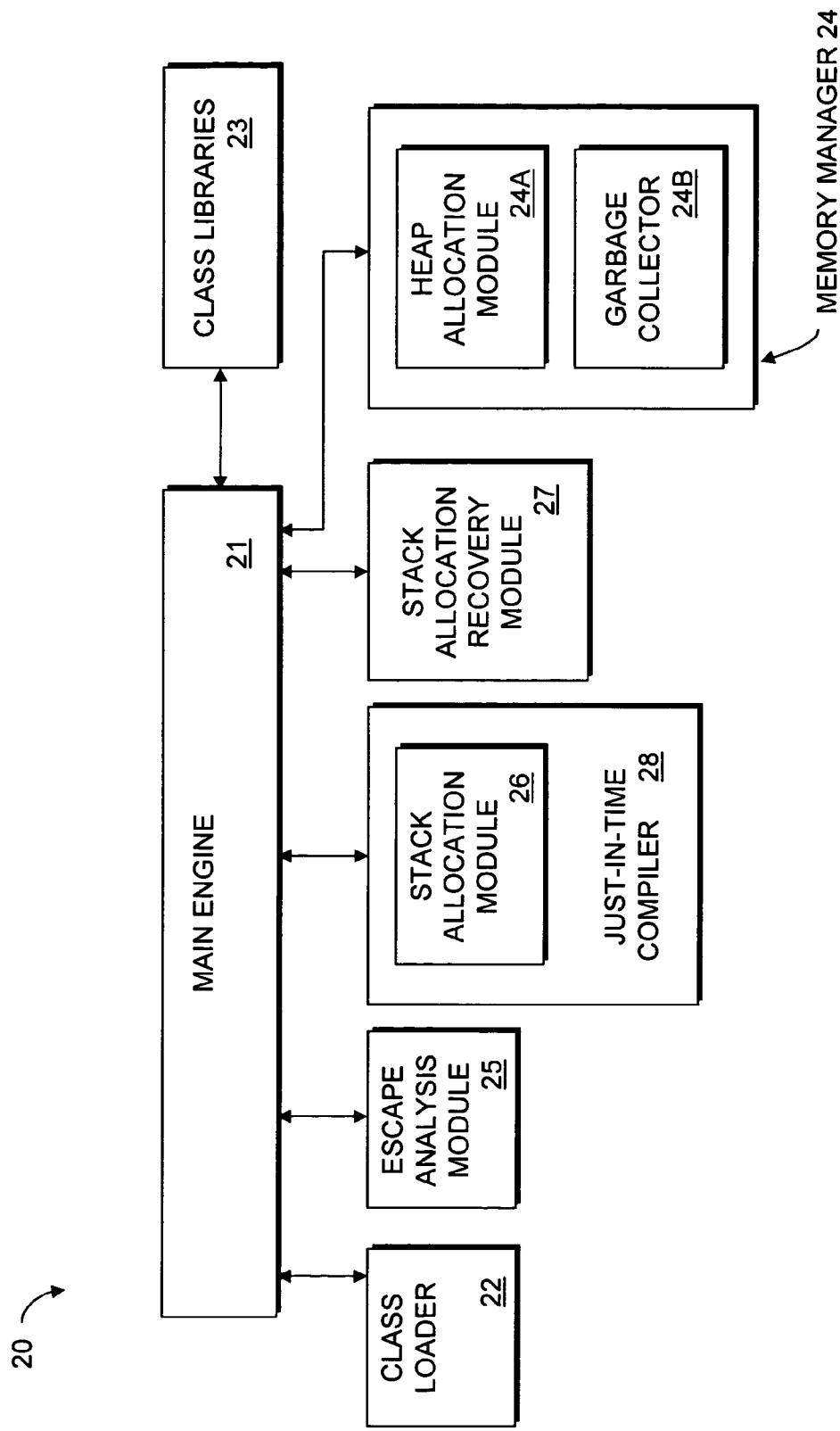
FIG. 2 is a block diagram of the virtual machine of FIG. 1 that includes a stack allocation module, an escape analysis module, and a stack allocation recovery module in accordance with one embodiment of the present invention.

FIG. 1 shows a software program compilation and execution system 10 that includes a virtual machine 20 (can also be referred to as a runtime environment or a runtime system) that implements an embodiment of the present invention. FIG. 2 shows in more detail the virtual machine 20 that includes an escape analysis module 25, a stack allocation module 26, and a stack allocation recovery module 27. In accordance with one embodiment of the present invention, these modules 25–27 permit stack allocation to software programs written in programming languages (e.g., Object-Oriented Programming Languages (OOPLs)) with open world languages features.

As will be described in more detail below, the modules 25–27 (1) perform the stack allocation to the program in accordance with an escape analysis of the program that is based on a closed-world assumption, and then (2) recover all invalidated stack allocations due to the occurrence of one or more of the open-world features back to their heap allocations. The open-world features may refer to language features such as dynamic class loading, native methods/invocation, reflection, or other features. The open-world features can dynamically link in the methods that are about to be called.

These open-world features, however, may break the closed-world (or whole-program) assumption that assumes that a compiled program can be statically linked before execution. The closed-world assumption assumes that all methods that can possibly be executed during the program execution are known statically and no other classes or methods will be dynamically loaded. Because the open-world features introduce new classes and new method implementations dynamically during the program execution, the open-world features change the program's behavior in such a way that some previously made optimization (e.g., stack allocation) is no longer valid.

The operation in accordance with one embodiment of the present invention may begin with the escape analysis module 25 determining which objects of the program can be stack-allocated under the closed-world assumption. The stack allocation module 26 then stack-allocates these objects based on the determination results of the escape analysis module 25. During execution of the program, when at least one of the open-world features occurs, the escape analysis module 25 is again invoked to analyze which stack allocation is invalidated due to the occurrence of the open-world features. This analysis is then fed to the stack allocation recovery module 27 to recover those invalidated stack allocations back to their original allocation in heap. The structure and operation of these modules 25–27, in accordance with one embodiment of the present invention, will also be described in more detail below, also in conjunction with FIGS. 1 through 7B.

As can be seen from FIG. 1, the software program compilation and execution system 10 includes a compiler 12 that compiles a source code program 11 into an intermediate language code 13. The source code program 11 is written in one of OOPLs having the open-world features. The OOPLs are also platform-independent programming languages.

In one embodiment, the OOPL is Java (developed by Sun Microsystems, Inc.). In another embodiment, the OOPL is a programming language that is conformed to CLI (Common Language Infrastructure). CLI is developed by Microsoft Corporation from Redmond, Wash. for its .NET technology, and has become an ISO (International Organization for Standardization) standard (i.e., ISO/IEC 23271).

The compiler 12 compiles the source code program 11 to generate the intermediate language code 13. The compiler 12 can be implemented using known technology. The compiler 12 is a software system and is run on a computer system (not shown).

The intermediate language code 13 is stored in a memory (not shown) of the computer system. When the source code program 11 is written in Java, the intermediate language code 13 is Java byte-code. If, however, the source code 11 is written in a programming language conformed to CLI, then the intermediate language code 13 is a CIL (Common Intermediate Language) code.

The system 10 also includes a virtual machine 20 and an execution system 14 that further compile the intermediate language code 13 into native code and execute the native code. According to an embodiment of the present invention, native code is machine code that is particular to a specific architecture or platform. The execution system 14 employs the virtual machine 20 to help further compile the intermediate language code 13 into native code that is platform-specific (or architecture-specific) to the execution system 14 and execute the native code. As described above, the virtual machine 20 can also be referred to as the runtime environment or runtime system. The virtual machine 20 is hosted by the execution system 14.

The execution system 14 can be, for example, a personal computer, a personal digital assistant, a network computer, a server computer, a notebook computer, a workstation, a mainframe computer, or a supercomputer. Alternatively, the execution system 14 can be of any other electronic system with data processing capabilities. The intermediate language code 13 may be delivered to the execution system 14 via a communication link such as a local area network, the Internet, or a wireless communication network.

The execution system 14 includes an operating system (not shown in FIG. 1) and system-specific hardware (also not shown in FIG. 1). The operating system can be an open standard Linux operating system or other type of operating system. The system-specific hardware of the execution system 14 can be any hardware that includes all necessary modules to execute the operating system sufficiently.

In one embodiment, the virtual machine 20 is implemented as a software system. In this case, the virtual machine 20 runs on the execution system 14. In a further embodiment, the virtual machine 20 is a Java virtual machine. In another embodiment, the virtual machine 20 can be other type of runtime system (e.g., small talk runtime system). Alternatively, the virtual machine 20 may be implemented using other techniques (e.g., as a firmware system). FIG. 2 is a block diagram illustrating the functional structure of the virtual machine 20, which will be described in more detail below.

Referring to FIG. 2, the virtual machine 20 includes a main engine 21, a class loader 22, class libraries 23, a memory manager 24, as well as the modules 25–27. The stack allocation module 26 is within a just-in-time compiler 28, which is also part of the virtual machine 20. The modules 25–27 are the escape analysis module 25, the stack allocation module 26, and the stack allocation recovery module 27.

The main engine 21 is employed as the main core of the virtual machine 20. The main engine 21 monitors compilation and execution of the intermediate language code, and invokes other modules 22–28 when required. Thus, the main engine 21 is the coordinator of different modules 22–28.

The class loader 22 is used to load classes. The class loader 22 may also perform other functions associated with loading classes. For example, the class loader 22 also verifies the loaded classes. The class libraries 23 are used to store shared classes. This is due to the fact that a program may include two types of classes, (i.e., application-specific class and shared class).

The memory manager 24 is used to manage a specific memory space within the memory referred to as heap or heap space. The memory manager 24 includes a heap allocation module 24a and a garbage collector 24b. The heap allocation module 24a is used to allocate objects to the heap space in the memory. The garbage collector 24b is used to reclaim memory space in the heap used by objects that are no longer referenced by an application or method. Additionally, the garbage collector 24b also may move objects to reduce heap fragmentation. The memory manager 24 interacts with the main engine 21 and the just-in-time compiler 28.

The just-in-time compiler 28 compiles the intermediate language code 13 (FIG. 1) to generate native or machine code at runtime that is executed by the execution system 14 (FIG. 1). According to an embodiment of the present invention, "just-in-time" refers to that the just-in-time compiler 28 compiling or translating each method or class when it is used for execution into native code. The just-in-time compiler 28 may also store some compiled native code in a just-in-time in-memory cache (not shown in FIG. 2). In this manner, the virtual machine 20 may reuse native code associated with a previously compiled method or object that is invoked or called more than once. The virtual machine 20 may also include an interpreter (not shown in FIG. 2). The modules 22–24 and 28 will not be described in more detail below.

As can be seen from FIG. 2, the stack allocation module 26 is within the just-in-time compiler 28. The stack allocation module 26 is used to perform stack allocation for some objects of the intermediate language code 13 (shown in FIG. 1). According to an embodiment of the present invention, stack allocation refers to the stack allocation module 26 allocating objects on a method's stack frame, rather than to the heap for each object. This is done by, for example, replacing heap allocation primitives or routines (e.g., new_object, or new_array) with their respective stack allocation versions (e.g., new_object_on_stack, or new_array_on_stack) that allocate objects and arrays on the stack (see FIG. 6).

The stack allocation module 26 stack-allocates those objects with a "lifetime" that does not extend beyond the method in which they are created. The technique used to determine which objects may be stack-allocated is the escape analysis. In the virtual machine 20, the escape analysis module 25 performs, among other functions, this escape analysis function. The escape analysis module 25 may perform other functionalities such as, for example, violation detection and code re-analysis. As described above, the escape analysis is a static analysis employed to determine which objects having lifetime that does not "escape" from the methods that create them.

The escape analysis module 25 escape-analyzes the whole program of the intermediate language code 13. The escape analysis module 25 may check all allocation sites and all method invocation sites with all of their possible types of receivers for allowing some type of optimization (e.g., stack allocation or synchronization removal) to be performed on the program. The escape analysis module 25 performs the escapes analysis based on the closed-world assumption.

The violation detection and code re-analysis functions of the escape analysis module 25 provide a re-analysis to the whole program when the open-world features occur during program execution. As described above, the occurrence of the open-world features will cause the previously made optimizing decisions at the escape analysis to be invalid. In this case, the escape analysis module 25 identifies those invalidated allocation sites.

The stack allocation recovery module 27 is employed to rectify the program by correcting those invalidated allocation sites caused by the newly loaded classes to maintain the program's correctness. This is also referred to as stack allocation recovery, which is to de-optimize those invalidated allocation sites. Upon receiving the re-analysis results from the escape analysis module 25, the stack allocation recovery module 27 performs the stack allocation recovery operation by de-optimizing those invalidated allocation sites from stack allocations back to their original heap allocation. In addition, the stack allocation recovery module 27 also analyzes runtime contexts and performs compensation publishing to publish objects on the stack to the heap.

Figure 3:
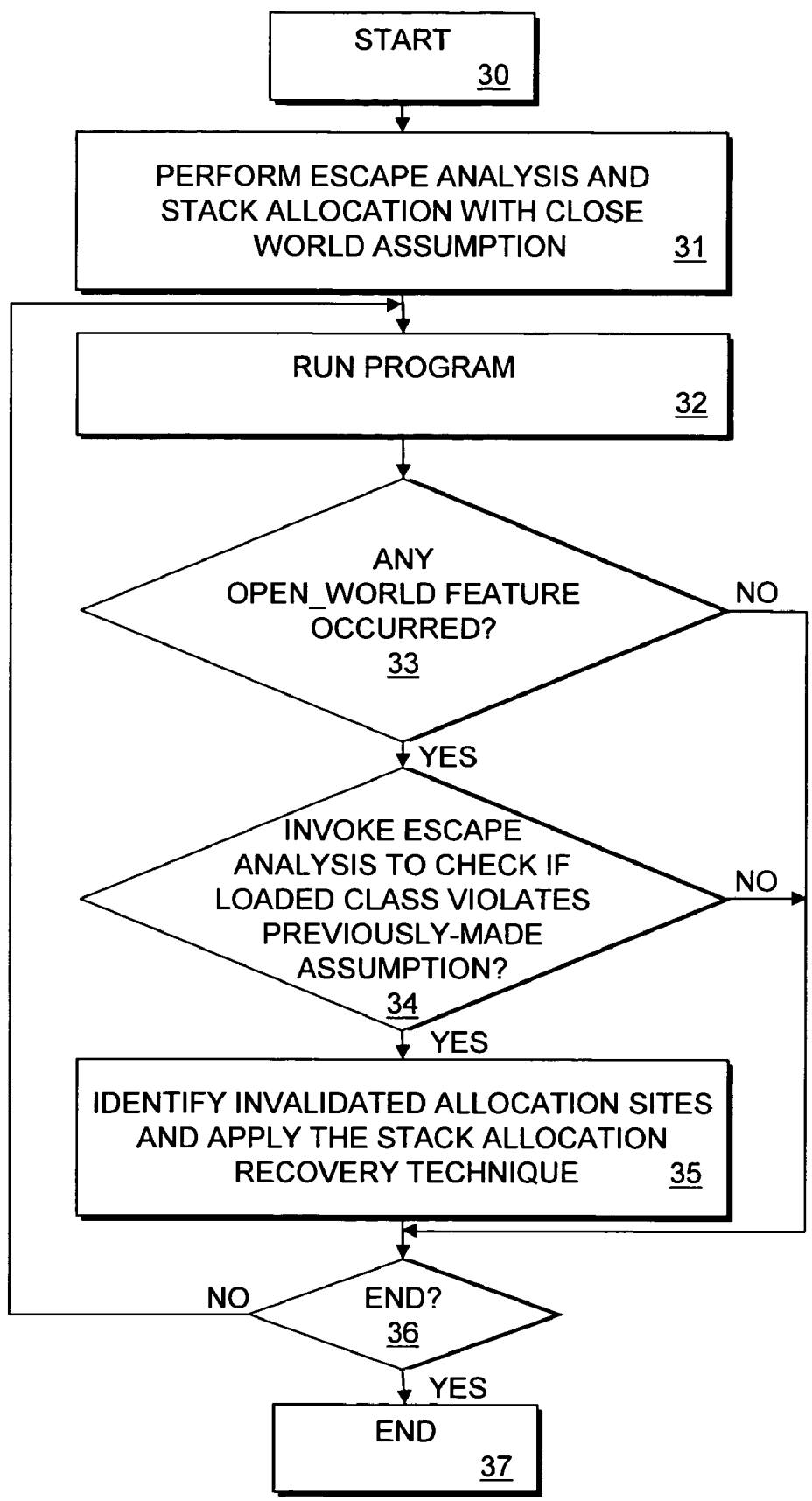
FIG. 3 is a flowchart diagram showing the overall process performed by the stack allocation module, the escape analysis module, and the stack allocation recovery module in accordance with one embodiment of the present invention.

FIG. 3 illustrates the overall operation of the modules 21 and 25–27 of FIG. 2 for permitting stack allocation for programs written in a programming language having the open-world features in accordance with one embodiment of the present invention. According to an embodiment of the present invention, the operation starts with the escape analysis identifying those objects within the program whose lifetimes do not "escape" from the methods that create them. The escape analysis is based on the closed-world assumption. The identified objects whose "lifetime" does not extend beyond the method in which they are created are then stack allocated aggressively with the assumption that no other classes will be dynamically loaded. As the open-world features occur (causing the previously made optimizing decisions to be invalid), the program is rectified to de-optimize those invalid stack allocation sites back to their original heap allocation versions. In addition, runtime contexts are analyzed and compensation publishing to the heap is performed for those objects whose "lifetime" does not extend beyond the method in which they are created. The operation is described in more detail below, in conjunction with FIGS. 2–7B.

As can be seen from FIGS. 2–3, during operation, the escape analysis module 25 is called by the main engine 21 to perform the escape analysis on the program code to be executed (block 31). The escape analysis module 25 performs the escape analysis on the entire program code to determine which objects have lifetimes that do not "escape" from the methods that create them. The escape analysis is based on the closed-world assumption.

The analysis is then reported by the escape analysis module 25 back to the main engine 21. The main engine 21 then invokes the stack allocation module 26 to stack-allocate the objects whose "lifetime" does not extend beyond the method in which they are created based on the analysis of the escape analysis module 25. The stack allocation module 26 then performs the stack allocation operation.

To illustrate the operation, the following code example is provided.

```
class Class1 {
    public static Class1 global;
    void do_nothing(Class1 obj) {}
    void synchronized foo( ) {
        global.do_nothing(this);
        ... ...
    }
} //Class1
void caller( ) {
    //allocation site A: stack allocatable
    Class1 obj = new Class1( );
    ... ...
    obj.foo( );
}
```

As can be see from the code above, based on the whole-program analysis, obj can be stack allocated in the caller's frame so that the heap allocation at site A can be transformed to stack allocation.

After the program runs for a period of time (block 32), a new class Class2 inheriting from Class1 is loaded using Class.forName( ) or other mechanisms, as shown in the following code.

```
class Class2 extends Class1 {
    void do_nothing(Class1 obj) {
        global = obj; //escape thread
    }
} //Class2
void caller( ) {
    //allocation site A: not stack allocatable any more
    Class1 obj = new Class1( );
    ... ...
    obj.foo( );
}
```

At this point, the public static field global could also be an instance of Class2. Class2's implementation of virtual method do_nothing assigns this to global field that results in obj being globally accessible (escape the method). Now the stack allocation at allocation site A is no longer valid, because obj may be accessed (e.g., by other threads through global field) even after obj's space is reclaimed during the return of method caller.

At the block 33, the main engine 21 determines if any of the open-world features has occurred (this can be done by determining whether the just-in-time compiler 28 has encountered any newly loaded class during runtime or execution). If the main engine 21 determines, at the block 33, that no open-world feature has occurred, then the operation moves to the block 36, at which it is determined whether the operation needs to be ended. If the answer is no, then the operation returns to the block 32 to continue running the program.

If, at the block 33, the main engine 21 determines that one or more of the open-world features have occurred, the operation moves to the block 34, at which the main engine 21 invokes the escape analysis module 25 again to check whether the newly loaded class violates the previously made optimization assumption. If so, then the main engine 21 invokes the stack allocation recovery module 27 (at block 35) to identify the invalidated allocation sites and apply the stack allocation recovery technique that de-optimizes the those invalidated stack allocation sites back to their original heap allocation versions, in accordance with one embodiment of the present invention. The stack allocation recovery process in accordance with one embodiment of the present invention will be described in more detail below, also in conjunction with FIGS. 4–7B.

Figure 4:
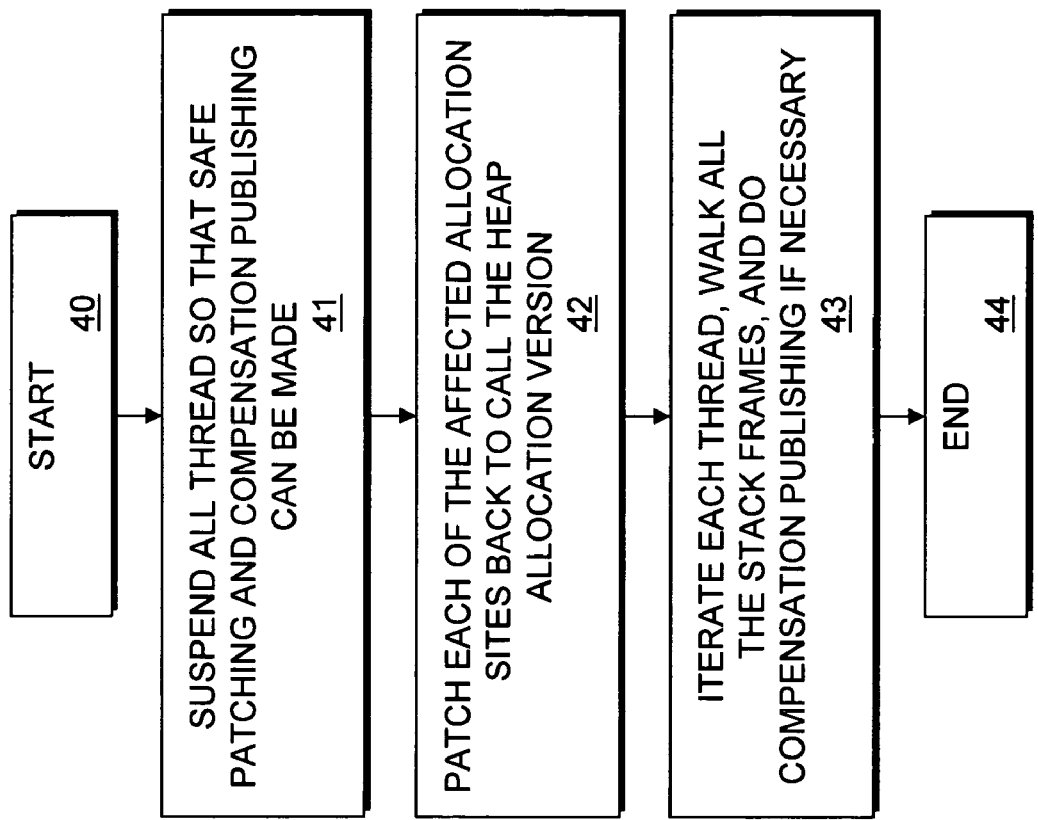
FIG. 4 is a flowchart diagram illustrating the stack allocation recovery process of FIG. 3 in accordance with an embodiment of the present invention.

Referring to FIG. 4, the stack allocation recovery process performed by the stack allocation recovery module 27 of FIG. 2 starts at the block 40. Block 41 shows the routine that the stack allocation recovery module 27 performs to suspend all threads so that safe patching and compensation publishing can be made. Given that invalidations by open-world features occur infrequently during the steady running state (true for most workloads and applications), the overhead of the stop-the-world solution is negligible.

Block 42 indicates the routine performed by the stack allocation recovery module 27 to patch each of the affected allocation sites back to call the heap allocation. This process is also referred to as reverse transformation because the transformation from heap allocation to stack allocation is revertible. As described above, the transformation from heap allocation to stack allocation is performed by the stack allocation module 26 (shown in FIG. 2) during JIT compiling time. After that, each stack allocation routine (e.g., new_object_on_stack new_array_on_stack (FIG. 6)) takes one more argument to tell the placement of the stack object. This argument can be referred to as "frame_offset" in one example.

The patching operation at the block 42 reverses the above-described transformation. To simplify the de-optimization, the stack allocation recovery module 27 patches the stack allocation routines back to heap allocation routines (e.g., new_object', or new_array'). The patched heap allocation routines differ from the original heap allocation routines (e.g., new_object, or new_array) because they consume one more argument (frame_offset) that is never used by new_object/new_array. This completes the reverse transformation from stack allocation to heap allocation (see FIG. 6).

Following the patching at the block 42, the stack allocation recovery module 27 iterates each thread, goes through all the stack frames, and conducts compensation publishing if necessary (block 43). During the operation at the block 43, all the stack objects created at the invalidated sites, along with other stack objects that are field-reachable via these objects, are published/migrated to the heap. Intuitively, the operation works like a moving garbage collection operation. In one embodiment, the root references pointing to all stack objects as well as field references within these objects are enumerated into a record set (e.g., stack_ref_set). The stack objects are then moved to the heap. Then the references are redirected to new object addresses in the heap. The pseudo code that implements one embodiment of the above-described operation (i.e., block 43) is shown below.

```
/* DS is a set of<caller, alloc_site>, provided
by Escape Analysis */
deoptimize_one_thread (thread, DS) {
    stack_ref_set = enumerate_stack_ref (thread);
    //(sub-routine 3.1)
    P = {}; // P is a set of stack ref that will be published to heap
    current_frame = current context of thread;
    while (current_frame is not bottom frame) {
        D = {<x,y> | <x,y> ∈ DS and
            current_frame.method == x};
        P += {<z, <x, y>, RA> | <x, y> ∈ D
            and <z, <x, y>, RA> ∈ stack_ref_set};
        current_frame = unwind_to_next_frame(current_frame);
    }
    publish_to_heap (P); //(sub-routine 3.3)
}
```

The operation illustrated in the block 43 is helpful because the reverse transformation in the block 42 can only guarantee the correctness of future execution. However, there may be active frames that are associated with affected optimized methods. In addition, some stack allocated objects presently residing on the stack may have become globally accessible by other threads due to a dynamic loaded class.

Figure 5:
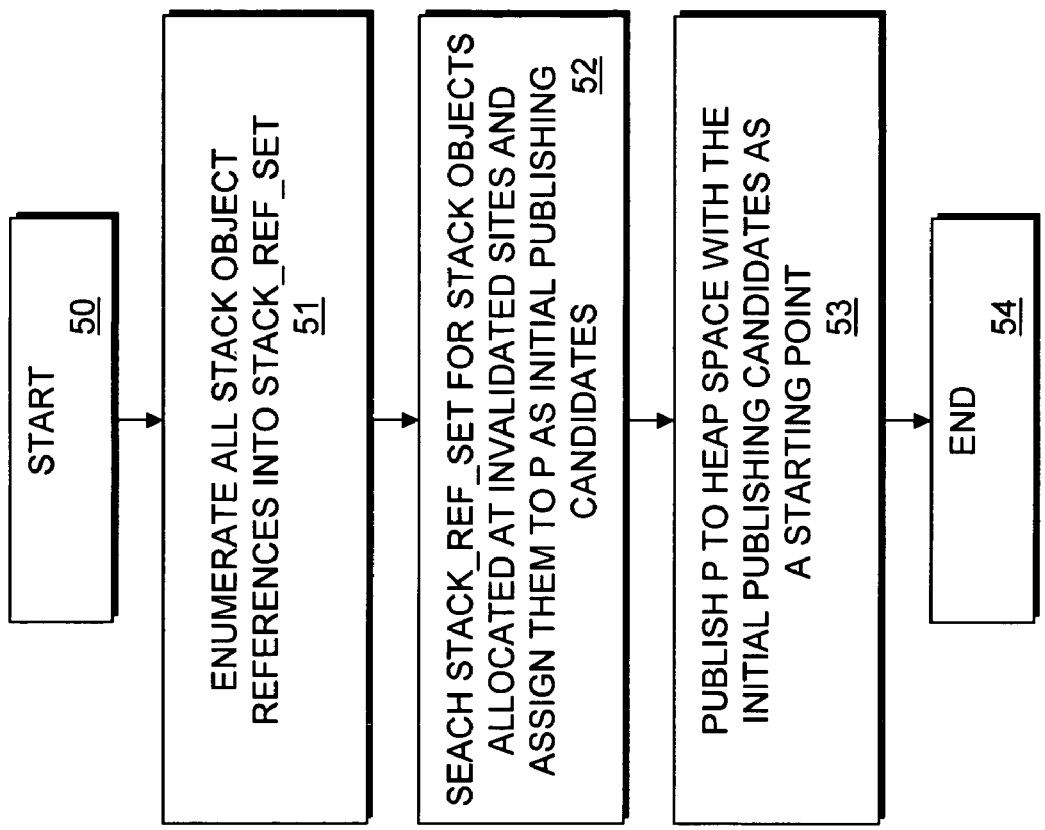
FIG. 5 is a flowchart diagram showing the process of iterating one thread's stack to publish invalidated stack objects according to an embodiment of the present invention.
Figure 6:
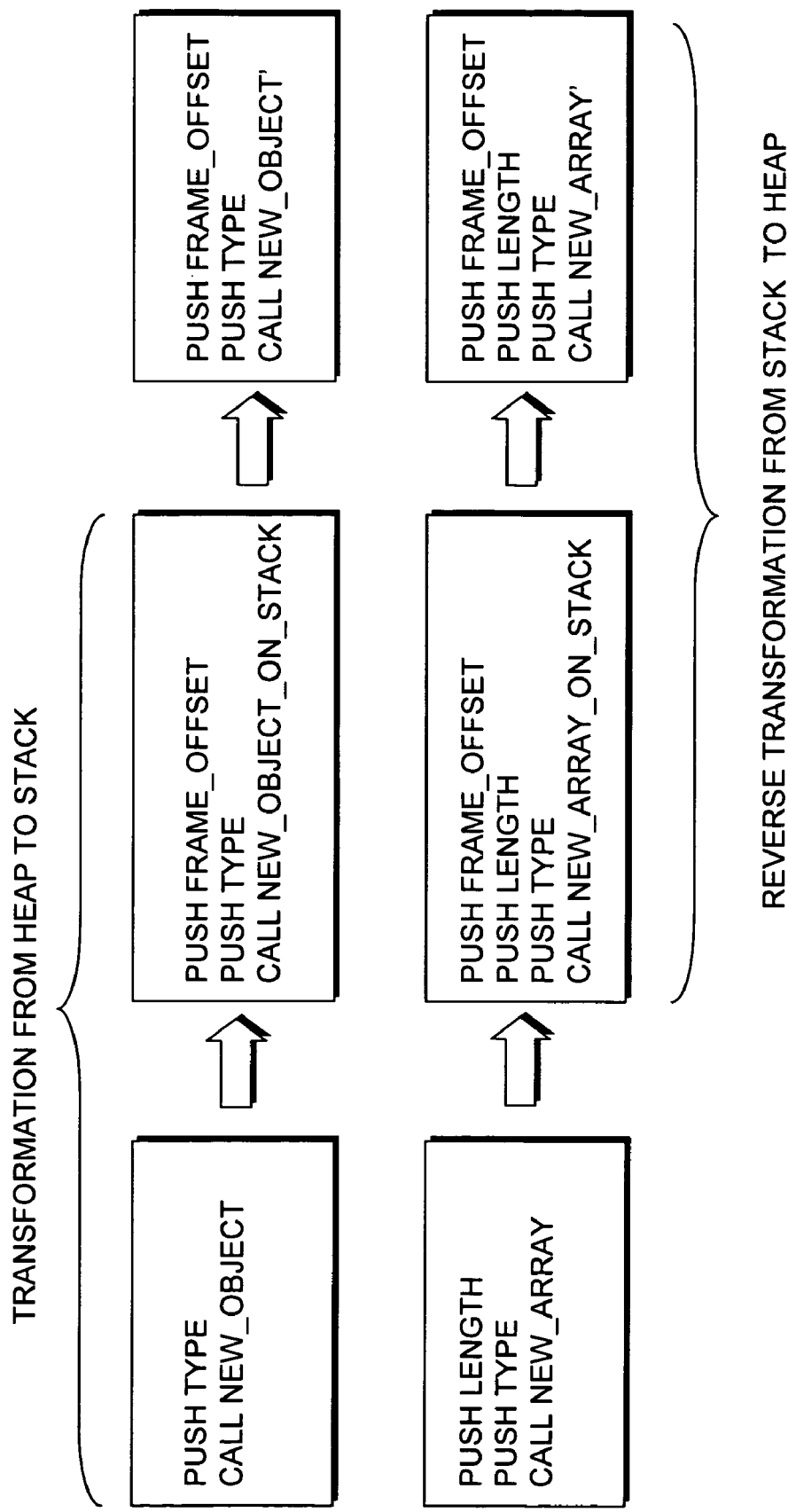
FIG. 6 shows an example of reverse transformation from stack allocation to heap allocation after the patching operation of FIG. 4 has been executed according to an embodiment of the present invention.

As can be seen from the block 43 of FIG. 4 and the above-listed pseudo code, the operation at the block 43 may be performed in three parts. FIG. 5 is a flow chart that illustrates an example of the operation shown in block 43 according to an embodiment of the present invention. The first part is to enumerate all stack object references into stack_ref_set (block 51). The stack_ref_set is a set of records like <stack_object, <caller, alloc_site>, RA>, wherein stack_object is the exact object that is allocated on the stack, <caller, alloc_site> corresponds to the allocation site of stack_object, and RA is a set of on-stack reference addresses that refers to stack_object. The enumeration operation at the block 51 enumerates all active references to those objects allocated on the stack through a walk through all stack frames, and enumeration of each frame depends on the garbage collection support of the virtual machine 20 (FIG. 2). This enumeration operation is referred to as the sub-routine 3.1 in the above-illustrated pseudo code. The pseudo code of the sub-routine 3.1 (i.e., for enumerating all active references to stack objects) in accordance with one embodiment of the present invention is shown below.

```
/* return a set like <stack_object, <caller, alloc_site>, RA> */
enumerate_stack_ref (thread) {
    current_frame = current context of thread;
    while (current_frame is not bottom frame) {
        for each ref_addr in current_frame.ref_addresses {
            if (deref(ref_addr) is stack object)
                stack_ref_set.add (ref_addr);
        }
        current_frame =
            unwind_to_next_frame(current_frame);
    }
    return stack_ref_set;
}
```

The routine stack_ref_set.add(ref_addr) shown in above pseudo code is implemented as follows. First, the routine checks whether the stack object that ref_addr refers to, stack_object, already exists in stack_ref_set. If so, the next operation of creating a new record is skipped. Then the routine creates a new record <stack_object, <caller, alloc_site>, RA> (since alloc_site has one-one mapping with frame offset in our implementation, we can infer it from frame offset of stack_object), and add the record to stack_ref_set. Then the routine implements the following operation: for current record, RA=RA+{ref_addr}.

Figure 7A:
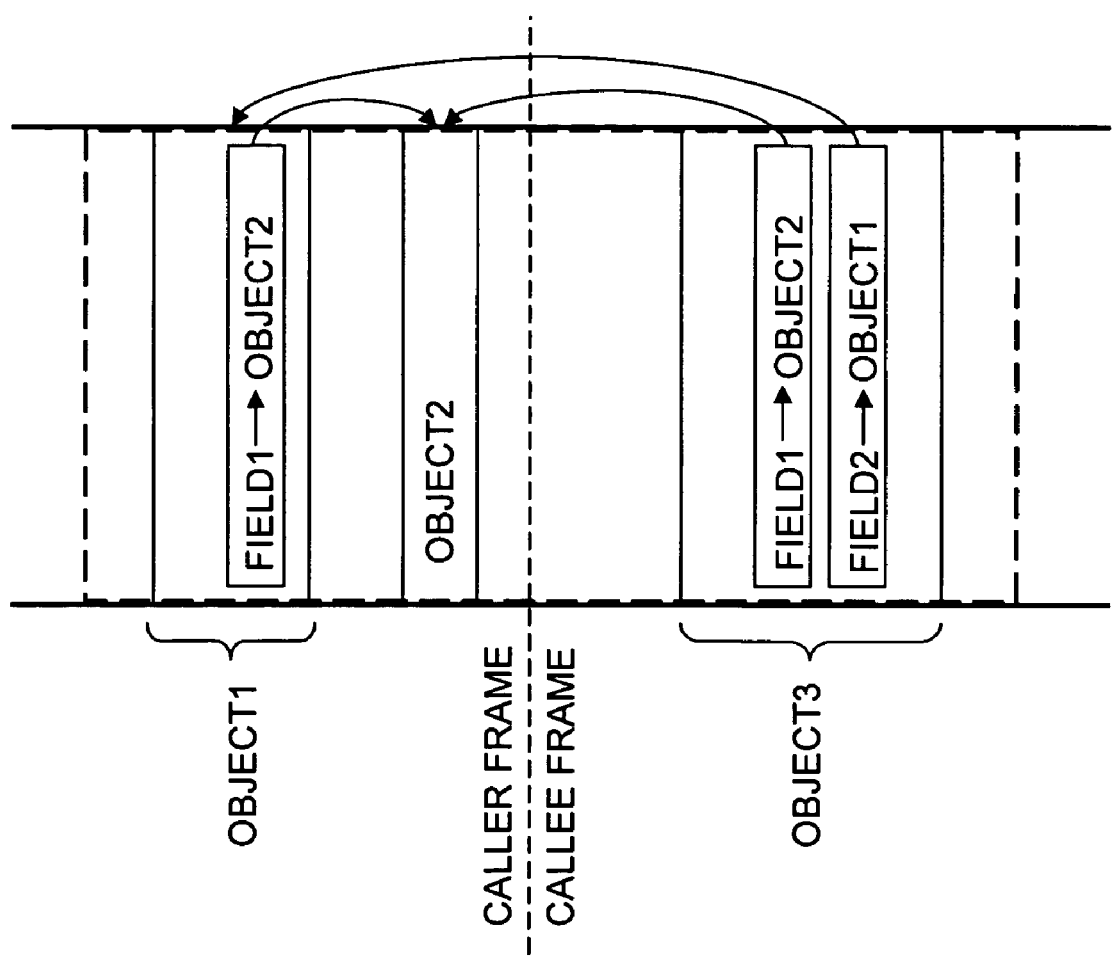
FIG. 7A shows one example of the physical layout of the stack at one time before the enumeration operation of FIG. 5
Figure 7B:
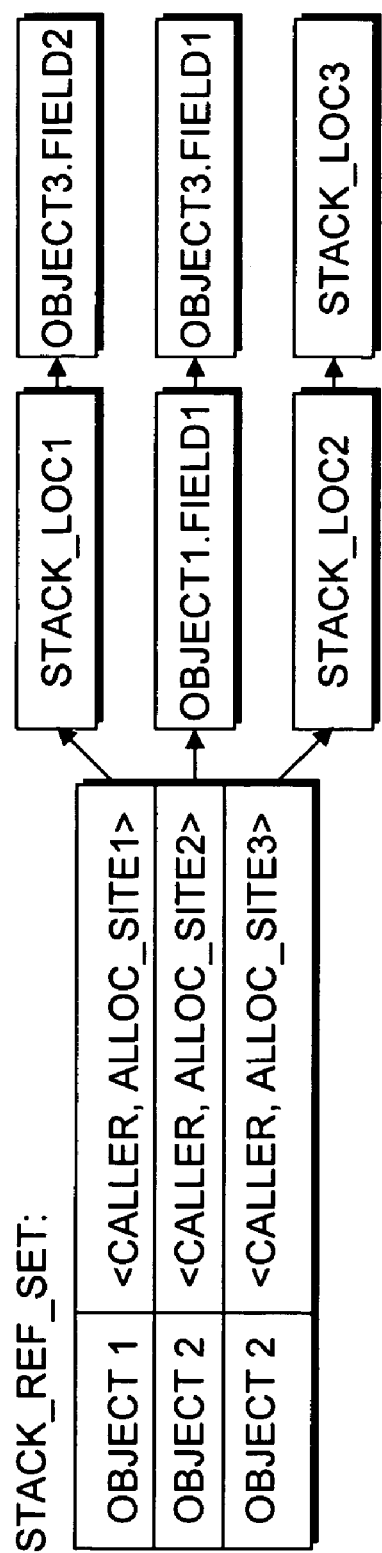
FIG. 7B shows the result after the enumeration operation according to embodiments of the present invention.

FIGS. 7A and 7B demonstrate the process of adding active references to stack objects into stack_ref_set according to an embodiment of the present invention. FIG. 7A shows the physical layout of the stack at one time (i.e., runtime snapshot) before the enumeration operation. FIG. 7B shows the result after the enumeration operation. As can be seen from FIGS. 7A and 7B, object1, object2 and object3 are stack objects, object1 has a field referring to object2, and object3 have two fields referring to object1 and object2 respectively. Besides these, there're three stack locations, stack_loc1 refers to object1, stack_loc2 and stack_loc3 refer to object3 respectively. After the enumeration process, three records are added into stack_ref_set as depicted in the FIG. 7B.

Referring back to FIG. 5, the second part of the operation indicated in the block 43 of FIG. 4 is to search, in the stack_ref_set, all stack objects that have been allocated at invalidated allocation sites, and to assign them to P as initial publishing candidates. As described above, P is a set of stack ref that will be published to heap. This search and assign operation indicated in the block 52 actually includes a number of operations. First, all the stack frames are checked from top to bottom. The invalidated sites belonging to the current frame (i.e., D in the above-illustrated pseudo code for block 43 of FIG. 4) are identified. Then the routine further checks whether there are stack objects allocated at the alloc_site by searching stack_ref_set. All found records corresponding to these objects are added into P, as initial publishing candidates.

At the block 53, the routine starts publishing P to heap. This compensation publishing operation is referred to as the sub-routine 3.3 in the above-illustrated pseudo code for the operation indicated in the block 43 of FIG. 4. The pseudo code of the sub-routine 3.3 (i.e., publish_to_heap (P)) in accordance with one embodiment of the present invention is shown below.

```
for each so in P {
    PS.push(so); // PS is a publishing stack,
    the counterpart of GC mark stack
}
while (!PS.empty( )) {
    so = PS.pop( );
    if (!is_published(so)) {
        ho = new_object(typeof(so)); /* allocate
        a copy in heap */
        replicate_state(ho, so);
        for each root in so's RA {
            deref(root) = ho;
        }
        for each field f of so {
            if (deref(f) is stack object) /* push
            corresponding record on publishing stack */
                PS.push( stack_ref_set.find(deref(f)) );
        }
        mark_published(so);
    }
}
```

The routine replicate_state shown in the above pseudo code for the sub-routine 3.3 copies not only the instance state of the stack object so, but also so's reflect information (e.g., lock info and hashcode). To avoid publishing the same object more than once, the record <stack_object, <caller, alloc_site>, RA> has an internal state published, indicating whether the record has been published. This guarantees the algorithm to be convergent. The root references pointing to so are then replaced with the location of its counterpart ho. In addition, so is scanned to find all other stack objects that can be reached via field references of so (because they are also globally accessible through ho).

FIGS. 3, 4, and 5 are flow charts illustrating methods according to embodiments of the present invention. Some of the procedures illustrated in the figures may be performed sequentially, in parallel or in an order other than that which is described. It should be appreciated that not all of the procedures described are required, that additional procedures may be added, and that some of the illustrated procedures may be substituted with other procedures.

In the foregoing specification the embodiments of the present invention have been described with reference to specific exemplary embodiments thereof. It will, however, be evident that various modifications and changes may be made thereto without departing from the broader spirit and scope of the embodiments of the present invention. The specification and drawings are, accordingly, to be regarded in an illustrative rather than restrictive sense.

What is claimed is:

1. A system, comprising:
a computer-based execution system including a processor and a memory;
a runtime system stored in and run on the execution system that includes
an escape analysis module to (1) determine which objects of a program can be stack allocated under a closed-world assumption and (2) analyze which stack allocation is invalidated due to an occurrence of an open-world feature;
a stack allocation module to stack allocate the objects determined by the escape analysis module; and
a stack allocation recovery module to recover invalidated stack allocations back to their original allocations in heap based on the analysis of the escape analysis module by suspending all threads so that safe patching and compensation publication can be made, patching each allocation site of the invalidated stack allocations back to its original allocation in the heap, and performing compensation publishing where necessary.

2. The system of claim 1, wherein the runtime system further comprises a main engine to, when the open-world feature occurs, invoke (1) the escape analysis module to check which stack allocation is invalidated and to identify allocation sites of the invalidated stack allocations, and (2) the stack allocation recovery module to recover the invalidated stack allocations.

3. The system of claim 1, wherein the stack allocation recovery module performs the patching by patching stack allocation instructions back to heap allocation instructions.

4. The system of claim 1, wherein the stack allocation recovery module performs the compensation publishing by:
enumerating all stack object references to objects allocated on a stack into a record set;
going through all stack frames and identifying allocation sites of the invalidated stack allocations within each frame;
in each invalidated allocation site, checking if there is any stack object allocated at this site by searching the record set, wherein objects found in the record set are added, as initial publishing candidates, into a compensation publication;
publishing the compensation publication to the heap beginning with the initial publishing candidates.

5. A computer-implemented method of permitting stack allocation in a program with open-world features, comprising:
determining which objects of the program can be stack-allocated under a closed-world assumption;
stack allocating these objects based on the determination;
analyzing which stack allocation is invalidated due to the occurrence of an open-world feature;
recovering those invalidated stack allocations back to their original allocations in heap based on the analysis by suspending all threads so that safe patching and compensation publishing can be made, patching each allocation site of the invalidated stack allocations back to its original allocation in the heap, and performing compensation publishing where necessary.

6. The method of claim 5, wherein the patching each allocation site of the invalidated stack allocations further comprises patching stack allocation instructions back to heap allocation instructions.

7. The method of claim 5, wherein the compensation publishing further comprises:
enumerating all stack object references to objects allocated on a stack into a record set;
going through all stack frames and identifying allocation sites of the invalidated stack allocations within each frame;
in each invalidated allocation site, checking if there is any stack object allocated at this site by searching the record set, wherein the objects found in the record set are added, as initial publishing candidates, into a compensation publication; and
publishing the compensation publication to the heap beginning with the initial publishing candidates.

8. The method of claim 5, wherein the analyzing which stack allocation is invalidated is performed when the open-world feature occurs.

9. The method of claim 5, wherein the recovering those invalidated stack allocations is performed after analyzing which stack allocation is invalidated.

10. A machine-readable medium having stored thereon sequences of instructions, the sequences of instructions including instructions which, when executed by a processor, causes the processor to perform:
determining which objects of a program can be stack-allocated under a closed-world assumption;
stack allocating the objects base on the determination;
analyzing which stack allocation is invalidated due to an occurrence of an open-world feature;
recovering invalidated stack allocations back to their original allocations in heap based on the analysis by suspending all threads so that safe patching and compensation publishing can be made, patching each allocation site of the invalidated stack allocations back to its original allocation in the heap, and performing compensation publishing where necessary.

11. The machine-readable medium of claim 10, wherein the patching each allocation site of the invalidated stack allocations further comprises patching stack allocation instructions back to heap allocation instructions.

12. The machine-readable medium of claim 10, wherein the performing the compensation publishing further comprises:

enumerating all stack object references to objects allocated on a stack into a record set;

going through all stack frames and identifying allocation sites of the invalidated stack allocations within each frame;

in each in allocation site, checking if there is any stack object allocated at this site by searching the record set, wherein the objects fund in the record set are added, as initial publishing candidates, into compensation publication; and publishing the compensation publication to the heap beginning with the initial publishing candidates.

13. The machine-readable medium of claim 10, wherein the analyzing which stack allocation is invalidated is performed when the open-world feature occurs.

14. The machine-readable medium of claim 10, wherein the recovering those invalidated stack allocations is performed after analyzing which stack allocation is invalidated.

15. The machine-readable medium of claim 10, wherein the instructions are part of a runtime environment.

16. The machine-readable medium of claim 10, wherein the machine-readable medium is a memory within a computer system.

* * * * *

UNITED STATES PATENT AND TRADEMARK OFFICE
CERTIFICATE OF CORRECTION

PATENT NO. : 7,168,071 B2
APPLICATION NO. : 10/675008
DATED : January 23, 2007
INVENTOR(S) : Wu et al.

Page 1 of 1

It is certified that error appears in the above-identified patent and that said Letters Patent is hereby corrected as shown below:

On the Title page, Item (56), under "Other Publications", in column 2, line 1, delete "Optimiztions" and insert -- Optimizations --, therefor.

On the Title page, Item (56), under "Other Publications", in column 2, line 3, delete "Systmes" and insert -- Systems --, therefor.

In column 13, line 6, in Claim 12, after "each" delete "in" and insert -- invalidated --, therefor.

Signed and Sealed this

Seventeenth Day of March, 2009

JOHN DOLL
*Acting Director of the United States Patent and Trademark Office*